March 1, 1966 G. M. UITERMARK ET AL 3,238,503

FREQUENCY RESPONSIVE SIGNALLING SYSTEM
EMPLOYING SELECTIVE PLURAL FREQUENCIES

Filed Feb. 23, 1960

INVENTOR.
G. M. UITERMARK
J. M. M. VELDSTRA

BY

AGENT 3,238,503
Patented Mar. 1, 1966

3,238,503

FREQUENCY RESPONSIVE SIGNALLING SYSTEM EMPLOYING SELECTIVE PLURAL FREQUENCIES

Gerardus Martinus Uitermark, Voorschoten, and Jan Max Mathijs Veldstra, Hilversum, Netherlands, assignors to North American Philips Company, Inc., New York, N.Y., a corporation of Delaware Filed Feb. 23, 1960, Ser. No. 10,341
Claims priority, application Netherlands, Apr. 23, 1959, 238,515
10 Claims. (Cl. 340—171)

Figures 1, 2, 3:
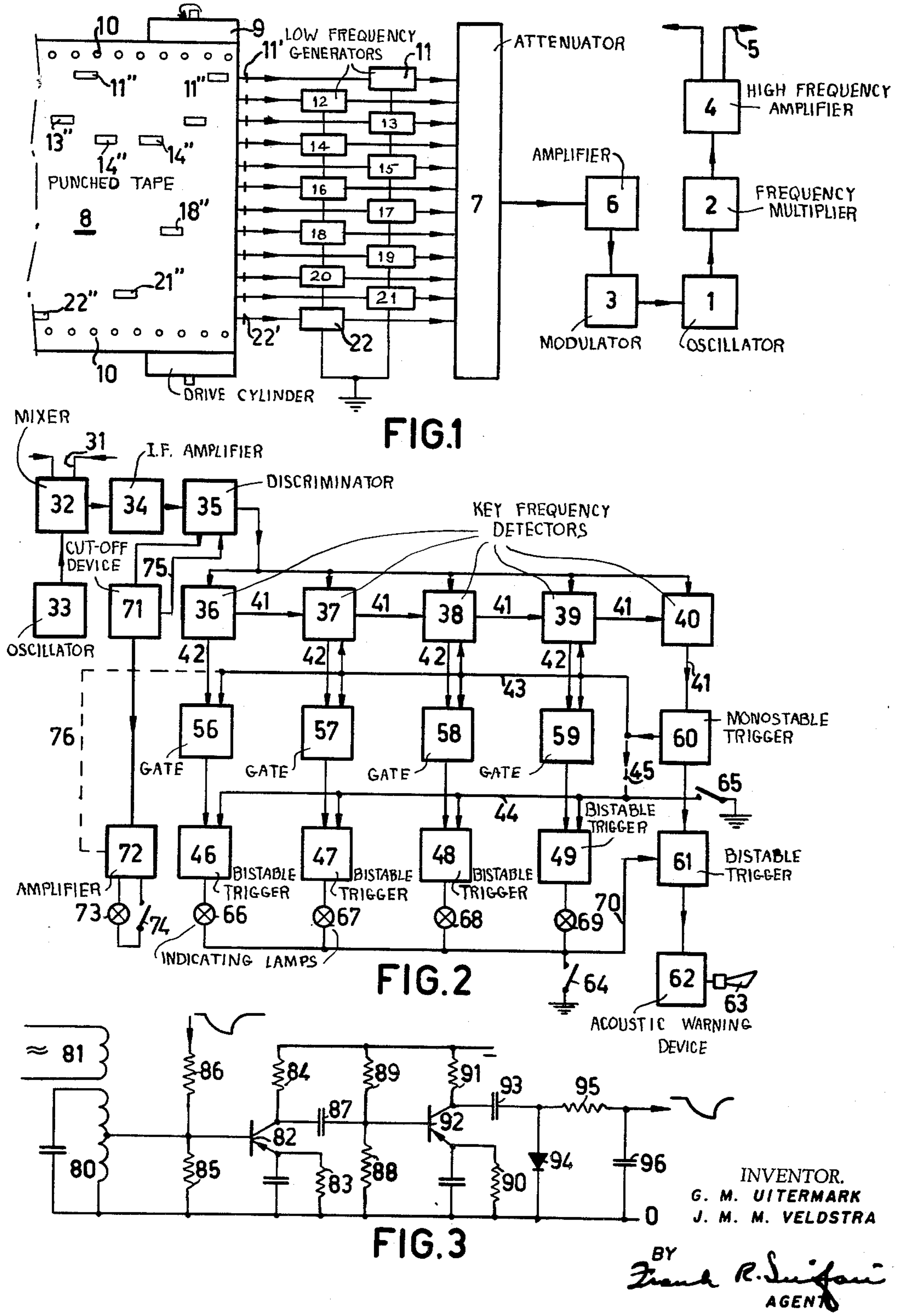

British patent specification No. 625,623 describes a selective calling system for the stations of a bilateral communication network, in which two or more arbitrary stations of the network are adapted to communicate with each other on an arbitrary frequency of a group of frequencies. According to this patent specification, a calling station emits the calling code of a station to be called and a further code indicating the intercommunication frequency to be employed, the whole on a frequency not employed for intercommunication purposes. Consequently, this patent specification provides an example of a radio transmission system for coded information transmission.

This coded information determines the choice of one of a number, for example 10 given intercommunication frequencies. It may be used, however, for the transmission of a predetermined indication, command or other coded information, for example, in a unilateral system.

The present invention relates to a similar system for the transmission between a transmitter and a receiver selected from a group of co-operating receivers, for example, a group of several thousands of receivers, the transmitter being adapted to be modulated with different key frequencies and each receiver is provided with at least two selective key-frequency detectors and can be called by means of a corresponding combination of at least two key frequencies, which combination is characteristic of the selected receiver. It is already known to use combinations of key frequencies, preferably successively modulated on a carrier, for selective calling of a receiver, for example from French patent specification No. 974,845.

The invention has for its object to provide a particularly simple system of the kind set forth by which coded information can be transmitted by the same means as the selective call and can be received with substantially the same means as the call. The system according to the invention is characterized in that, on the transmitter side, the information transmission takes places with the aid of key frequencies used for calling the selected receiver, whereas on the receiver side, provision is made of means by which, when a call comes through to a selected receiver, the key-frequency detectors thereof are made operative for the reception of the coded information. Thus the so-called decoding device of each receiver is drastically simplified, so that receivers of a system according to the invention may be designed as movable receivers, for example as car radio receivers or even as portable call- and code receivers for unilateral communication.

After each call, a pilot frequency modulated on the carrier is preferably transmitted, which frequency can only be received by each selected receiver, by means of a corresponding pilot-frequency detector, after a call has come through to this receiver. At the reception of the pilot frequency, this pilot-frequency detector renders the key-frequency detectors of the receiver concerned operative to receive the coded information.

This pilot frequency has the important function of separating from each other calls and coded informations transmitted successively at small time intervals. Each coded information contains preferably at least one frequency or frequency pulse less than each call, so that a coded information cannot possibly perform the calling of a receiver of the system. After each coded information the same or a different pilot frequency is preferably transmitted, which prepares the called receiver for the reception of a new call.

The pilot frequency emitted after a call may furthermore be useful for other purposes. It may, for example, control an acoustical or optical call warning device. In an extensive communication system comprising a plurality of urban or regional networks, each having one or more transmitters, whereby the various networks operate on a common wavelength or an adjacent wavelengths, a low-frequency discrimination between the various networks can also be obtained by means of different pilot frequencies.

In a system comprising a short-wave transmitter and movable receivers the field intensity of the incoming signal may vary very strongly in accordance with the actual site of the receiver. In a narrow street, for example, the signal may be very weak and it may even disappear completely when passing through a tunnel. Under these conditions, the call and the subsequent coded signal may be repeated, for example, after two or three minutes. It is then furthermore advisable to modulate the various key frequencies and the pilot frequency or frequencies on the carrier in succession and with a maximum modulation percentage, modulation index or frequency deviation. Thus, the various key- and pilot-frequency detectors produce comparatively high detected voltages and the transmission is less affected by noise voltages.

If only one pilot frequency is to be employed or even if no pilot frequency is to be used, the successions of signals comprising each a call- and a coded signal may be separated from each other by a time interval during which the carrier is not modulated or is suppressed. Similarly, for example in a system comprising only one network, each call signal may be separated from the subsequent coded signal by a time interval.

The invention will be described more fully with reference to the drawing, in which FIG. 1 shows a block diagram of a transmitter of one embodiment of the system according to the invention, FIG. 2 is a block diagram of a receiver of this embodiment, and FIG. 3 shows a diagram of one embodiment of a key-frequency detector for use in a receiver of the system according to the invention.

Together wtih FIG. 2, FIG. 1 shows one embodiment of a system according to the invention. FIG. 1 shows a block diagram of the transmitter. The transmitter shown comprises a master oscillator 1 and a subsequent frequency multiplier 2, the output voltage of which is amplified in a high-frequency amplifier 4, whilst the carrier wave produced by the oscillator 1 is modulated, for example, in frequency by a modulator 3. The output of the amplifier 4 is connected to a transmitting aerial 5 and an input of the modulator 3 is connected to an amplifier 6.

The input of the amplifier 6 is connected to the output of a common attenuator 7. The attenuator 7 has twelve inputs, each of which is connected to the output of a low-frequency generator 11 to 22. These generators are controlled or keyed by corresponding contacts 11′ to 22′ so that, at any time, one of the generators produces a corresponding low-frequency voltage and that, at any time, only one of these generators oscillates. This is achieved by means of a punched paper tape 8, which is driven at a substantially constant speed by means of a cylinder 9. The cylinder 9 is driven by an electric motor (not shown) and is provided with teeth co-operating with rows of holes 10 of the paper tape 8. The paper tape 8 has further holes 11″, 13″, 18″, 21″ and 22″. Together these holes 11″ to 22″ constitute a recording of a call, a pilot tone, a subsequent coded information and a second pilot- or separating tone. The recording is scanned by means of contacts 11′ to 22′ and each time when one of the holes 11″ to 22″ arrives underneath a corresponding contact 11′ to 22′, a control circuit is closed via this contact and the cylinder 9. This circuit controls the corresponding generator 11 to 22, which then produces a modulation frequency for the time during which its control-contact remains in contact with the cylinder 9 via the said hole. The attenuator 7 brings the oscillations from the various generators to such a common level that each modulation frequency, in the case of frequency modulation, produces approximately the maximum frequency deviation of the carrier, for example, a maximum frequency deviation of about 15 kc./s., or, in the case of phase modulation, the maximum modulation index. In the case of amplitude modulation the said level will be chosen so that each modulation frequency produces approximately 100% modulation of the carrier.

The receiver shown in FIG. 2 comprises a receiving aerial 31 and a mixing stage 32 connected thereto, having a local oscillator 33. The output of the mixing stage 32 is connected to the input of an intermediate-frequency amplifier 34 and the output of this amplifier controls an intermediate-frequency limiter, coupled with a frequency discriminator 35. To the output of the discriminator 35 is connected a series of selective tone detectors 36 to 40. Apart from the first detector 36, these tone detectors are normally inoperative, their respective detection elements being, for example biased by a cut-off voltage. If the first key-frequency detector 36 receives the correct, corresponding modulation frequency, a direct voltage is produced in it, which releases the subsequent key-frequency detector 37 via a conductor 41, for example, by suppressing at least partly the cut-off voltage of the detection element.

If the order of succession and the respective frequencies of the modulations produced with the aid of the recording of the tape 8 correspond with the order of succession and the respective frequencies of the key-frequency detectors 36 to 39, the last tone detector 40 is also released. This tone detector is tuned to the pilot-frequency produced by the generator 21 at the instant when the hole 21″ arrives below the contact 21′. At the reception of this pilot frequency, the pilot-frequency detector 40 controls a monostable trigger 60 having a given time constant. This trigger in turn controls a bistable trigger 61 via a conductor 43 and, during the time determined by its time constant, it opens the gates 56 to 59 and suppresses at least partly the cut-off bias voltage of all key-frequency detectors 37 to 39, so that all key-frequency detectors are simultaneously sensitive. Owing to this change-over of the gates 56 to 59 and to the release of the key-frequency detectors 37 to 39, the receiver is ready for the reception of a coded information.

The coded information is emitted in the form of an arbitrary combination of the frequencies by which the call has been brought about. The order of succession of the emitted modulation frequencies does no longer play any part, since all key-frequency detectors are now simultaneously sensitive. As is shown in FIG. 1, the coded information comprises three pulses with three different of the frequencies used for the call. If a fourth pulse of one of these frequencies had been emitted, the coded information could, under certain conditions, bring about a call for a different receiver having the same key-frequencies in a different order of succession.

Since the gates 56 to 59 are now open, bistable triggers 46 to 49 are controlled via the conductor 42 by the key-frequency detectors 36 to 39. In succession, the detectors 39, 36 and 37 produce pulses and the corresponding bistable triggers 49, 46 and 47 are brought from the rest condition into the operative condition.

By the change-over of the bistable trigger 61 at the reception of the first pilot tone, an acoustical warning device 62 is made operative. A loudspeaker 63 produces a warning signal until the user closes a contact 64 by depressing a push-button. When the contact 64 is closed, the bistable trigger 61 is brought back into its rest position via a conductor 70; the warning signal is stopped. At the same time, indicating lamps 66, 67 and 69 corresponding to the bistable triggers 46, 47 and 49 which are in their operative condition, are ignited. The combination of these three lamps has a particular meaning in accordance with a predetermined code. In total sixteen combinations are possible, inclusive of the case in which no indicating lamp burns and of the case in which the four lamps 66 to 69 are ignited. When the same pilot frequency is used or if a time interval is used between each call and the subsequent coded information and between this information and the subsequent call, the same order of succession of the transmitted frequencies as for the call is to be used in the last-mentioned case, since this coded information could otherwise be taken for the call signal of another receiver.

The indication lamps 66 to 69 burn only as long as the contact 64 is closed. This means that they do not take current unnecessarily from the battery or other supply source. However, the code or the received information is stored in the bistable triggers 46 to 49 and may be read repeatedly, until the user closes a second contact 65 by means of a push-button. Via a conductor 44 this second contact switches back the bistable triggers 46 to 49 into their respective rest conditions, so that, as soon as the monostable trigger 60 changes over to its rest condition, the receiver is ready for receiving a new call. The change-over of the bistable triggers 46 to 49 may, as an alternative, be carried out automatically at the reception of the first pilot frequency pulse of a subsequent call. In this case, the bistable triggers 46 to 49 are brought back into their rest condition by the monstable trigger 60, via a conductor 45 shown in broken lines.

When a second pilot tone is employed, as is illustrated in FIG. 1, the receiver comprises a selective detector for this pilot tone. Together with the detector 40, this selective detector controls a bistable trigger which fulfils the function of the monstable trigger 60.

Conversely, the system may be operated without pilot frequency. The monostable trigger 60 may, for example, be controlled directly by the key-frequency detector 39 for the last key frequency. In order to avoid calling of receivers not to be called by a combination of one or more of the modulation pulses of the coded information and of three, two or one last modulation pulse of the call, a time interval is to be introduced between these last pulses and the pulses of the coded information and the time-constant of the monostable trigger 60 is to be raised accordingly. Similarly to the time interval following a coded information and replaceable by a second pilot-frequency pulse, the said time interval must be longer than one modulation pulse, it must, for example, have the duration of two pulses. This affects adversely the efficiency of the transmitter and reduces it by about 12.5 and 25% respectively and, moreover, as stated above, at least one pilot-frequency pulse is very suitable to bring about a separation between various networks of the communication system comprising a plurality of transmitters operating on the same wavelength.

The receiver shown in FIG. 2 comprises furthermore a fieldstrength indicator. This indicator is controlled by a direct voltage produced in a cut-off device 71, connected to the discriminator 35 and being, for example, of the type described in United States application Serial No. 733,587, filed May 7, 1958, now Patent Number 3,084,-291. It comprises a direct-voltage amplifier 72, operating as a switch. The output circuit of the amplifier 72 includes an indicating lamp 73 in series with the contact 74 of a push-button switch. The cut-off device 71 and the amplifier 72 are adjusted so that the lamp 73 can be ignited by means of the contact 74, when the intermediate-frequency voltage has a signal-noise ratio exceeding a given minimum value, i.e. exceeding a threshold below which the receiver is cut off by the cut-off device 71 via a conductor 75 and owing to the noise voltage produced in the discriminator 35.

In a system in which the second pilot tone 22 or the separation tone is replaced by a momentary suppression of the carrier, the fieldstrength indicator with the amplifier 72 may be used to prepare the receiver for the reception of a new call, via a conductor 76 shown in broken lines. In general, and also in this case, the amplifier 72 may be adapted to render a monitoring device operative via a delay network, which device responds to a longer absence or to an attenuation of the carrier wave.

FIG. 3 shows an embodiment of a key- or pilot-frequency detector. This detector comprises a selective circuit 80, which is coupled to the output of the discriminator 35, as shown at 81. To a tapping of the inductor of the selective circuit 80 is connected the base of an amplifying transistor 82. The emitter circuit of this transistor includes a by-passed resistor 83 and its collector circuit includes a load resistor 84, through which the collector of the transistor 82 is polarized in the reverse direction. As well as its emitter, the base of the transistor 82 is connected to earth via a resistor 85, so that the transistor 82 is normally locked by its natural emitter-base threshold and the low-frequency voltage produced across the selective circuit 80 is not amplified at all or is amplified only to a small extent. Via a resistor 86, a forward bias voltage can, however, be fed to the base. This voltage renders the selective detector operative and keys it. The detector comprises a second transistor 92, which is connected in cascade with the transistor 82. Its base is coupled to the collector of the transistor 82 by means of a capacitor 87 and is polarized in the forward direction by means of a potentiometer consisting of resistors 88 and 89. Its emitter is connected to earth via a bypassed resistor 90 and its collector circuit includes a load resistor 91. The collector of the transistor 92 is connected to a rectifier 94 via a coupling capacitor 93. To the common point of the capacitor 93 and the rectifier 94 is connected a time-constant network consisting of a series resistor 95 and a shunt capacitor 96. At the reception of the corresponding modulation frequency a negative voltage is produced at the output of the network 95, 96, which voltage can be used for keying a subsequent key- or pilot-frequency detector and for controlling a monostable or bistable trigger. The time constant of the network 95, 96 must therefore be longer than the duration of one modulation pulse; it lies preferably between one and a half and two times the durations of a pulse.

The number of participating receivers in the system described depends upon the number of different modulation frequencies.

When using $n$ key-frequency pulses for each call and N different key frequencies, the maximum number of subscribers is equal to $N^n$ with repetitions and to $$N(N-1)(N-2)\ \ldots\ [N-(n-1)]$$

without repetitions.

In the embodiment described, there are ten different key frequencies and two pilot frequencies. Ten different key frequencies provide 10,000 different combinations inclusive of the case in which the same frequency is emitted twice or more times in the same call. If these repetitions are to be excluded, the number of subscribers is restricted to 5040. However, this number can be easily raised by increasing the number of different key frequencies. The maximum numbers of subscribers without repetition of the key frequencies are equal to 7920 with 11 different key frequencies and to 11,880 with 12 different key frequencies. With ten different key frequencies and one pilot-frequency, the lowest frequency being for example 40 c./s. and with a frequency distance of half an octave between the various low frequencies, the highest modulation frequency amounts to not more than 1.28 k./c., so that in the case of amplitude modulation an intermediate-frequency amplifier with a very narrow bandwidth can be used. On the other hand, the said relative distance between the various modulation frequencies is comparatively large, so that the construction of the selective key- and pilot-frequency detectors 36 to 40 does not give rise to difficulties. Nevertheless use is preferably made of key- and pilot-frequencies exceeding about 1 kc./s. In this frequency range, a satisfactory selection can readily be obtained and the low-frequency range of the transmitter modulation can, if desired, be used for other purposes, for example, for the transmission of speech signals to particular receivers. The number of possible code combinations is:

$$2+\sum_{K=1}^{k=n-1}\frac{n!}{k!(n-k)!}$$

instead of $n$, when the condition of the order of succession is not suppressed, i.e. in the case considered, instead of four possible codes:

$$2+\frac{24}{1.6}+\frac{24}{2.2}+\frac{24}{1.6}=2+4+6+4=16$$

which is sufficient for the uses aimed at. Moreover, the receiver can then be provided with additional key-frequency detectors, which are used only for the transmission of information. The number of possible code combinations is then:

$$2+\sum_{k=1}^{k=n'-1}\frac{n'!}{k!(n'-k)!}$$

wherein $n'$ exceeds $n$ designating the number of key-frequency pulses of the call signal.

In order to render the receiver comparatively insensitive to interference peaks, the key- and pilot-frequency detectors are to operate with a given time lag, which again requires a minimum pulse length. It has been found that in a system comprising movable (car) receivers and having modulation pulses of a length of 0.25 to 0.5 sec., a satisfactory call reliability is obtained. Under these conditions a call inclusive the transmission of the coded information, of a first pilot frequency and of a second pilot frequency, which may be replaced by a time interval, takes 1.5 to 2.5 or 3 to 4.5 secs. respectively, in accordance with the number of pulses of the coded information (0 to 3): i.e. on the average less than 2 and 4 secs. respectively. Consequently, a single transmitter is capable of dealing with 1800 calls an hour. For a system comprising 10,000 participants this is sufficient even at rush hours, so that the call reliability can be considerably increased by automatic repetition of all calls, for example, after two minutes.

The consigners may, for example, be connected with the transmitter via a kind of Telex link. The Telex receiver can thus punch the incoming call and the desired coded information directly in the tape 8. In order to ensure adequate utilization of the Telex receiver and of the transmission time, memory devices can be included between the lines of the consignors and the Telex receiver.

The system described may be exploited in conjunction with existing telephone networks with or without movable stations and can extend over a whole country.

What is claimed is:

1. A transmission system for selective transmission of coded information between a transmitter and a receiver, said transmitter comprising a source of a plurality of predetermined key frequency oscillations, and means for transmitting a call signal in the form of a selected combination of said key frequency oscillations and for subsequently transmitting a coded information signal in the form of at least one frequency of said selected combination, said receiver comprising a plurality of frequency selective detector means each responsive to a single frequency of said selected combination, means for receiving said signals and applying them to said detector means, output circuit means, and control means connected to said detector means, said control means comprising means for rendering said detector means simultaneously sensitive upon reception of said call signal, so that they can detect said information signal, and means for connecting all of said detector means to said output circuit upon reception of said signal.

2. A transmission system for selective transmission of coded information between a transmitter and a receiver, said transmitter comprising a source of a plurality of predetermined key frequency oscillations, means for transmitting a call signal in the form of a sequential group of a selected combination of said key frequency oscillations, and means for subsequently transmitting a coded information signal in the form of at least one frequency of said selected combination, said receiver comprising a plurality of frequency selective detector means each responsive to a frequency of said selected combination, means for receiving said signals and applying them to said detector means, means interconnecting said detector means so that they are sequentially operative during the reception of said call signal, and control means connected to said detector means, said control means comprising means for rendering said detector means simultaneously sensitive upon reception of said call signal, so that they can detect said coded information signal.

3. A transmission system for selective transmission of coded information between a transmitter and a receiver, said transmitter comprising a source of carrier oscillations, a source of a plurality of predetermined key frequency oscillations, means for modulating said carrier oscillations with a call signal comprising means for sequentially modulating said carrier oscillation with a selected combination of said key frequency oscillations, means for subsequently modulating said carrier with a coded information signal comprising means for modulating said carrier oscillation with a coded group of said selected combination, and means for transmitting said modulated carrier, said receiver comprising means for receiving and demodulating said carrier oscillations, a plurality of frequency selective detector means each responsive to a frequency of said selected combination, means applying said received signals to said detector means, means interconnecting said detector means so that they are sequentially operative during the reception of a call signal and control means connected to said detector means, said control means comprising means for rendering said detector means simultaneously sensitive upon reception of said call signal, so that they can detect said coded information signal.

4. A transmission system for selective transmission of coded information between a transmitter and a receiver, said transmitter comprising a source of carrier oscillations, a source of a plurailty of predetermined key frequency oscillations, means for modulating said carrier oscillations with a call signal comprising means for sequentially modulating said carrier oscillation with a selected combination of said key frequency oscillations, means for subsequently modulating said carrier with a coded information signal comprising means for modulating said carrier oscillation with a coded group of said selected combination, and means for transmitting said modulated carrier, said receiver comprising means for receiving and demodulating said modulated carrier, a plurality of key frequency detectors, means applying the demodulated output of said receiving and demodulating means to said key frequency detectors, said detectors being interconnected so that reception of a predetermined frequency of said selected combination by each detector renders the next successive detector operative, output circuit means, switching means connected to said detectors for rendering all of said detectors simultaneously sensitive to detect said coded information signal and for connecting said detectors to said output circuit means upon reception of said call signal.

5. The system of claim 4, in which said transmitter comprises means for modulating said carrier with a pilot signal between each call signal and information signal, and said switching means comprises means responsive only to said pilot signal, said means responsive to said pilot signal being connected to the last detector whereby said pilot signal responsive means is rendered sensitive to detect said pilot signal only upon reception of said call signal.

6. The system of claim 4, in which said transmitter comprises means for transmitting a separation signal between each coded information signal and a subsequent call, said switching means of said receiver being responsive to the reception of said separation signal to prepare said receiver for the reception of a new call signal.

7. The system of claim 6, in which said means for transmitting a separation signal comprises means for suppressing said carrier oscillation.

8. The system of claim 4, in which said receiver comprises means responsive to the field strength of said carrier oscillations received by said receiver for preparing siad receiver for reception of a new call signal upon momentary disappearance of said carrier oscillation.

9. A transmission system for selective transmission of coded information between a transmitter and a receiver, said transmitter comprising a source of carrier oscillations, a source of a plurality of predetermined key frequency oscillations, means for modulating said carrier oscillations with a call signal comprising means for sequentially modulating said carrier oscillation with a selected combination of said key frequency oscillations, means for subsequently modulating said carrier with a coded information signal comprising means for modulating said carrier oscillation with a coded group of said selected combination, and means for transmitting said modulated carrier, said receiver comprising means for receiving and demodulating said modulated carrier, a plurality of frequency selective detectors, means applying the output signal of said receiving and demodulating means to said detectors, said detectors being interconnected so that reception of a predetermined frequency by one detector renders the next successive detector operative, and switching circuit means connected to said detectors for rendering said detectors simultaneously operative upon reception of a complete call signal, memory circuit means, said switching circuit means comprising means connecting said memory circuit means said detectors upon reception of a call signal whereby the subsequent coded information signal is stored in said memory circuit means.

10. The system of claim 9, comprising means for resetting said memory circuit means upon reception of a new call signal.

References Cited by the Examiner

UNITED STATES PATENTS

| | | | |
|---|---|---|---|
| 2,523,315 | 9/1950 | Mayle | 340—171 |
| 2,524,782 | 10/1950 | Ferrar et al. | 340—171 |
| 2,535,162 | 12/1950 | Rodgers | 340—312 |
| 2,547,024 | 4/1951 | Noble | 340—171 |
| 2,579,470 | 12/1951 | Brown | 343—228 |
| 2,600,405 | 6/1952 | Hoeppner | 340—171 |
| 2,658,942 | 11/1953 | Durkee | 178—66 |
| 2,759,045 | 8/1956 | Young | 340—171 |
| 2,784,393 | 3/1957 | Schultheis | 340—171 |
| 3,039,081 | 6/1962 | Smith | 340—312 X |
| 3,035,250 | 5/1963 | Durkee et al. | 340—171 |
| 3,098,220 | 7/1963 | De Graaf | 340—311 |
| 3,119,982 | 1/1964 | Willems | 340—171 |
| 3,124,658 | 3/1964 | Sneath | 340—311 X |

NEIL C. READ, *Primary Examiner.*

IRVING L. SRAGOW, HERMAN K. SAALBACH, *Examiners.*